US005710375A

United States Patent [19]

Roger

[11] Patent Number: 5,710,375

[45] Date of Patent: Jan. 20, 1998

[54] V-ENGINE EQUIPPED WITH MEANS FOR TAKING MEASUREMENTS

[75] Inventor: Christian Marie Michel Roger, Bois-Colombes, France

[73] Assignee: Societe Hispano-Suiza, Colombes Cedex, France

[21] Appl. No.: 754,794

[22] Filed: Nov. 21, 1996

[30] Foreign Application Priority Data

Nov. 22, 1995 [FR] France .................................. 95 13833

[51] Int. Cl.[6] .................................................. G01M 15/00

[52] U.S. Cl. .......................... 73/117.3; 73/116; 73/119 R

[58] Field of Search .................................. 73/35.07, 116, 73/117.1, 117.2, 117.3, 119 R

[56] References Cited

U.S. PATENT DOCUMENTS

| | | | |
|---|---|---|---|
| 4,468,956 | 9/1984 | Merlo | 73/119 R |
| 4,633,707 | 1/1987 | Haddox | 73/119 R |
| 5,106,202 | 4/1992 | Anderson et al. . | |

FOREIGN PATENT DOCUMENTS 2254969 10/1992 United Kingdom .

OTHER PUBLICATIONS

Von W. Kubler, "Kolbentemperaturmessung mit Telemetrie am Beispiel eines Temperaturvergleichs zwischen MAN–Dieselmotoren", MTZ Motortechnische Zeitschrift, vol. 56, No. 1 (pp. 72–77), Feb. 1, 1995.

*Primary Examiner*—Richard Chilcot
*Assistant Examiner*—Eric S. McCall
*Attorney, Agent, or Firm*—Oblon, Spivak, McClelland, Maier & Neustadt, P.C.

[57] ABSTRACT

For the purpose of taking measurements within a V-engine while it is running during development of the engine, a first of the two banks of piston and cylinders defining the V is provided with measurement sensors and is arranged to run normally performing the normal cycle of induction, compression, combustion, and exhaust, and each cylinder of the second bank has its fuel inlet closed and its combustion chamber open to the atmosphere whereby the second bank functions without compression and combustion and is effectively inert, the second bank serving as a mechanical support for conveying signals from the measurement sensors.

9 Claims, 1 Drawing Sheet

V-ENGINE EQUIPPED WITH MEANS FOR TAKING MEASUREMENTS

BACKGROUND OF THE INVENTION

The invention relates to an internal combustion piston engine comprising a plurality of pistons and cylinders disposed in two banks defining a V, the engine being equipped with means for taking measurements while the engine is running. The invention is particularly applicable to the development phase of a V-engine for the purpose of evaluating the thermal and dynamic behaviour of the pistons and/or the connecting rods while the engine is running.

Taking measurements on a connecting rod or on a piston in a V-engine is difficult, or even impossible, while the engine is running. This is because of the small amount of space available around the piston/connecting rod moving parts, and also because the temperature, the speed and the lubrication pose great restrictions on making wire connections or fitting telemetry equipment between the piston/connecting rod assembly and the cylinder head or crank case.

BRIEF DESCRIPTION OF THE INVENTION

In order to overcome this problem, the invention provides an internal combustion piston engine comprising a plurality of pistons and cylinders disposed in first and second banks defining a V, wherein said first bank is provided with measurement sensors and is arranged to perform the normal cycle of induction, compression, combustion, and exhaust, and wherein each cylinder of said second bank has its fuel inlet closed and its combustion chamber open to the atmosphere whereby said second bank functions without compression and combustion and is effectively inert, said second bank serving as a mechanical support for means for conveying signals from said measurement sensors.

The measurement sensors may be arranged on the pistons and/or on the connecting rods of the first bank.

The piston in each cylinder of the second bank of the V has an outer face facing the combustion chamber of the cylinder, and the conveying means preferably comprises a transmission device mounted on said outer face of the piston, and connecting wires connecting said measurement sensors to said transmission device. The transmission device may, for example, be a telemetry device with a radio link to equipment arranged outside the engine for recording the sensor measurements. Alternatively, the transmission device may comprise a flexible or articulated mechanical link between the outer face of the piston and the cylinder head, making it possible to extend the connecting wires from the sensors to measurement recording equipment arranged outside the engine.

Other preferred features and advantages of the invention will become apparent from the following description of the preferred embodiments, given by way of non-limiting example, with reference to the attached drawings.

DESCRIPTION OF THE PREFERRED EMBODIMENTS

Figure 1:
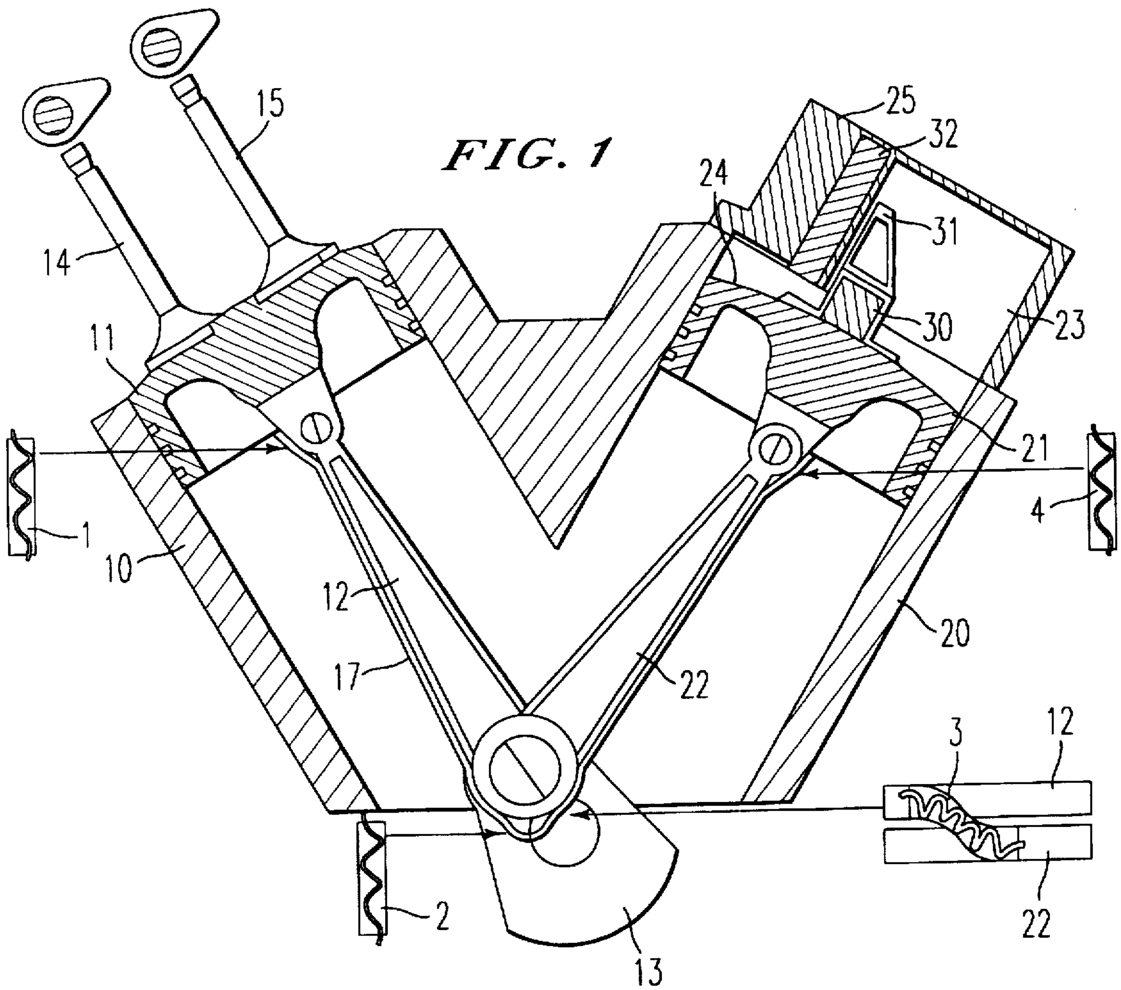
FIG. 1 shows a diagrammatic sectional view through one cylinder of each of the two banks of a V-engine equipped with means for taking measurements in accordance with a first embodiment of the invention; and, FIG. 2 shows a diagrammatic sectional view through the cylinder head and the crown of the piston in a cylinder of the inert bank of a V engine in accordance with a second embodiment of the invention.

Fuel-injected V-engines comprise two sets of cylinders arranged in two banks forming a V, and the number of cylinders can vary from one engine to another. In FIG. 1, two cylinders 10,20 are shown, one from each bank. Each of the cylinders 10,20 houses a piston 11, 21 pivotally connected to a connecting rod 12,22, and the two connecting rods are mounted on the same crankshaft 13.

Since the two banks of a V-engine are independent, it is possible to have just one of the two banks running without altering the thermal or dynamic behavior of the connecting rods and pistons which are running. The power of the engine is simply halved.

Thus, as shown in FIG. 1, each cylinder of the first bank includes inlet and exhaust valves 14,15, and runs in the normal way following the successive cycle of induction, compression, combustion, and exhaustion. In contrast, each cylinder of the second bank has no inlet valve and no exhaust valve, its fuel inlet is closed, and the combustion chamber 23 is vented to atmosphere. The second bank therefore functions without compression or combustion, and is effectively inert. Under these conditions, only half the engine runs under power.

Measurements are therefore arranged to be made on the bank which runs under power, by mounting sensors, not shown, on each piston 11 and/or connecting rod 12 of this bank. The second bank is used as a support for the connecting wires 17 of the sensors and as a support for a device for transmitting the measurements taken by the sensors to equipment (not shown) outside the engine for recording the measurements.

In the first embodiment of the invention shown in FIG. 1, the device for transmitting measurements is a telemetry device mounted on the outer face 24 of the piston 21, this face facing the combustion chamber and hence being open to the atmosphere and to ambient temperature. The extra mass added by the transmission device needs to be as small as possible so as not to reduce the engine performance or to cause damage to the various parts of the engine (piston, connecting rod, crankshaft) during operation. This problem of the mass added by the telemetry device may, however, be alleviated by lightening the piston 21 and the connecting rod 22, which have no function of compression, so as to compensate for the added mass.

In order to prevent the leakage of any oil, the cylinder 20 is preferably closed by a cylinder head 25 consisting, for example, of a plate.

The measurement sensors which are placed on the piston 11 and/or the connecting rod 12 may be thermocouples, strain gauges, accelerometers, or Eddy current probes.

The connecting wires which connect the various sensors to the telemetry device placed on the outer face of the piston 21 are routed along and bonded to the connecting rods 12, 22. At the junctions between the pistons and their associated connecting rods and between the two connecting rods, the wires are preferably routed in flexible components 1, 2, 3, 4 which support the wires. At the pivotal mounting of the two connecting rods, the wires run around the mounting and pass from one connecting rod to the other via the flexible component 3. The wires reach the telemetry device via a sealed passage (not shown) through the crown of the piston 21.

The telemetry device comprises an emitter 30 provided with a transmitting antenna, the emitter being fixed on the outer face 24 of the piston 21 and powered by induction or by a battery. Powering by induction may be achieved, as shown, by means of an assembly consisting of a wound stator 32 and a wound coil 31, the stator 32 being stationary and the coil 31 being disposed facing the stator 32 and being linearly movable relative thereto. The stator 32 is fixed, for example, to the cylinder head 25 which closes the cylinder 20, and the coil 31 is mounted on the emitter 30 and follows the movements of the piston 21.

The measurements made by the sensors are processed by the emitter 30 and transmitted by radio waves via the transmitting antenna to a recorder located outside the engine.

Figure 2:
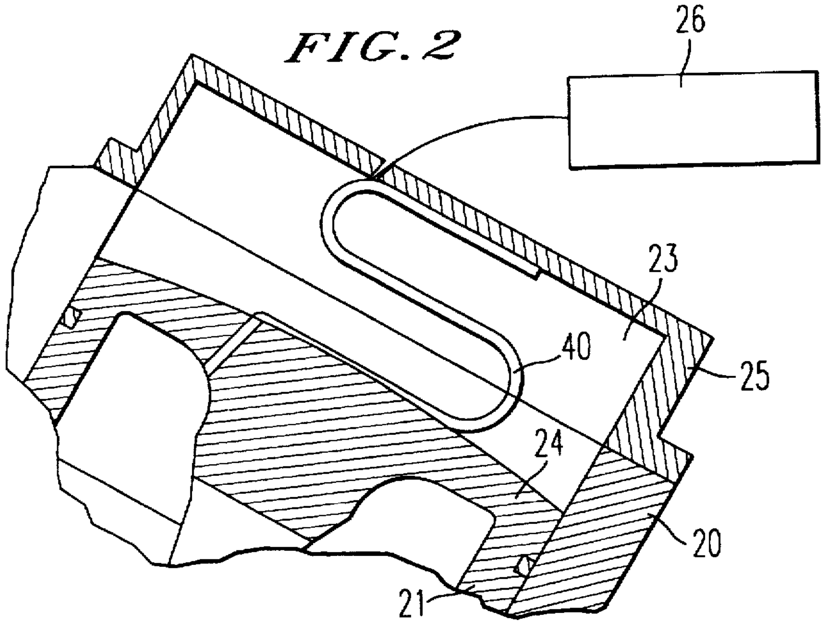

FIG. 2 shows diagrammatically an alternative arrangement for transmitting the measurements in a second embodiment of the invention. In this case the transmission device comprises a flexible or articulated mechanical link 40, for example a flexible strip, arranged between the crown of the piston 21 and the cylinder head plate 25 which covers the cylinder 20. The mechanical link 40 has two ends fixed one to the outer face 24 of the piston 21 and the other to the plate 25. This allows the sensor measurements to be routed all the way to an external recorder 26 by the connecting wires 17 leading from the sensors. The mechanical link 40 acts as a support for the connecting wires 17 between the crown of the piston 21 and the cylinder head plate 25, and its length is at least equal to that of the stroke of the piston 21. A sealed passage is provided in the crown of the piston 21 to allow the connecting wires to pass through the crown. The wires are then routed along, and are bonded to, the mechanical link 40, and pass from the link 40 to an external recorder 26 via a second sealed passage provided in the cylinder head 25.

The present invention is, of course, not limited to the embodiments as described above. For example, the wires may be routed in a different way, such as along the crank cases of the cylinders. Also, the link 40 and the flexible components 1, 2, 3, 4 may be replaced by springs or any other equivalent means which is rigid enough for the wires not to move about uncontrolledly, and at the same time flexible enough to follow the movements of the pistons and the connecting rods.

I claim:

1. An internal combustion piston engine comprising a plurality of pistons and cylinders disposed in first and second banks defining a V, wherein said first bank is provided with measurement sensors and is arranged to perform the normal cycle of induction, compression, combustion, and exhaust, and wherein each cylinder of said second bank has a fuel inlet closed and a combustion chamber open to the atmosphere whereby said second bank functions without compression and combustion and is effectively inert, said second bank serving as a mechanical support for means for conveying signals from said measurement sensors.

2. A piston engine as claimed in claim 1, wherein the piston in each cylinder of said second bank has an outer face facing said combustion chamber of said cylinder, and said conveying means comprises a transmission device mounted on said outer face of the piston, and connecting wires connecting said measurement sensors to said transmission device.

3. A piston engine as claimed in claim 2, wherein said piston is pivotally mounted on a connecting rod, and an assembly of said piston and said connecting rod is lightened so as to compensate for an added mass of said transmission device.

4. A piston engine as claimed in claim 3, wherein a flexible component is provided wherever said connecting wires pass between a piston and the associated connecting rod or between two connecting rods, and said connecting wires are mounted in said flexible component.

5. A piston engine as claimed in claim 2, wherein said transmission device is a telemetry device comprising an emitter having a transmitting antenna, and means for powering the emitter.

6. A piston engine as claimed in claim 5, wherein said means for powering the emitter is an induction device comprising a stationary wound stator and a wound coil which is disposed facing said stator and is movable linearly relative thereto.

7. A piston engine as claimed in claim 6, wherein said stator is fixed to a cylinder head which closes said cylinder, and said coil is mounted on said emitter on said piston.

8. A piston engine as claimed in claim 2, wherein said cylinder is provided with a cylinder head, and said transmission device comprises a mechanical link having one end fixed to said outer face of the piston and another end fixed to said cylinder head, and extensions of said connecting wires leading out of said cylinder, said connecting wire extensions being supported by said mechanical link between said piston and said cylinder head.

9. A piston engine as claimed in claim 8, wherein the length of said mechanical link is at least equal to the stroke of said piston.

* * * * *